United States Patent [19]

Hughes

[11] Patent Number: 4,808,842

[45] Date of Patent: Feb. 28, 1989

[54] DUAL VOLTAGE GENERATOR SYSTEM

[76] Inventor: William L. Hughes, 1016 E. Airport Rd., Stillwater, Okla. 74074

[21] Appl. No.: 175,420

[22] Filed: Mar. 30, 1988

[51] Int. Cl.$^4$ .............................................. H02P 9/30
[52] U.S. Cl. .................................. 307/43; 307/10 R; 307/87; 307/75; 322/28; 322/40; 363/161; 363/165; 219/133
[58] Field of Search .................. 307/16, 38, 10 R, 58, 307/75, 82, 85, 87, 128, 130, 43; 290/1 R, 4 R, 4 A, 4 B, 38 R; 322/17, 25, 28, 32, 40; 219/121 EA, 133, 137 PS, 488; 363/10, 124, 150, 149, 160, 161, 163, 164, 165, 169; 320/15, 61, 17, 7, 16, 57; 323/204

[56] References Cited

U.S. PATENT DOCUMENTS

| | | | |
|---|---|---|---|
| 3,585,485 | 6/1971 | Gyugyi | 363/161 |
| 3,585,486 | 6/1971 | Gyugyi | 363/161 |
| 3,684,935 | 8/1972 | Sawyer et al. | 363/160 X |
| 3,959,720 | 5/1976 | Bose et al. | 363/161 X |
| 3,982,167 | 9/1976 | Espelage | 363/165 |
| 4,349,867 | 9/1982 | Otsuka et al. | 363/164 X |
| 4,604,528 | 8/1986 | Norton | 307/75 |
| 4,695,776 | 9/1987 | Dishner et al. | 322/40 |

Primary Examiner—William M. Shoop, Jr.
Assistant Examiner—Paul Ip
Attorney, Agent, or Firm—Head & Johnson

[57] ABSTRACT

A system for providing a regulated low voltage DC source and a regulated higher voltage AC source at a preselected frequency, such as 60 Hz. from the same windings of an alternator rotated at variable speeds including a phase WYE connected engine driven alternator providing three output posts and a neutral post and having a field circuit, a half-wave rectifier connected to each of the output posts of the alternator providing a low voltage DC source, a cycloconverter having a three phase input connected to the posts of the alternator and providing a single phase output at the preselected frequency, a resonating transformer having the primary connected to the output of the cycloconverter and having a capacitor in the secondary providing a resonant frequency at the desired AC frequency, such as 60 Hz., and a clock circuit providing an AC control voltage at a preselected frequency, such as 60 Hz., the clock being connected to the cycloconverter for control of the cycloconverter to provide the selected input frequency to the resonating transformer. The secondary of the resonating transformer providing the AC voltage source at the preselected frequency and a regulator circuit controlling the field current of the AC generator for regulating the AC voltage output of the resonating transformer.

6 Claims, 2 Drawing Sheets

DUAL VOLTAGE GENERATOR SYSTEM

SUMMARY OF THE INVENTION

This disclosure is a dual voltage generator system including a three phase alternator with a special winding, three phase cycloconverter, a transformer with an air gap and a capacitor which resonates in a way to multiply the capacative reactive, the system delivering a 115v. AC 60 Hz. output, and a 12-14 volt DC output.

The alternator is wound with three individual 14 volt windings connected in WYE such that the rectifier system (three phase, half-wave, line to neutral) provides 12-14 volts to run, when the generator is installed on a vehicle, the ordinary vehicle circuits and to charge the conventional vehicle battery.

The three phase line to line output circuits of the alternator simultaneously feed a twelve SCR, three phase cycloconverter. The SCR's are triggered such that a 60 Hz. output occurs. The output leads from the cycloconverter, together with the alternator neutral, are fed to a specially wound and gapped resonating transformer with a resonating capacitor.

The system operates as follows: the line to neutral voltage presented to the transformer primary taps is turned on for approximately one half of a 60 cycle period. For each next half cycle of a 60 cycle period, a reverse 14 volts is applied from transform taps to one-half of the SCR's in the cycloconverter to provide the first half cycle voltage and the other half of the SCR's provide the second half cycle voltage. In essence, the first half of the SCR's are a full wave six diode rectifier system for ½ cycle of a 60 Hz. while the other half are inactive for that half cycle. The second half of the SCR's are a full wave six diode rectifier system for the next ½ cycle and the first six SCR's inactive for that half cycle.

An important feature of the system of this invention is the use of a resonant transformer fed by the cycloconverter. For example, for a 2 KW 60 Hz. system the transformer design is as follows:

1. The primary is 14 turns center tapped (7-0-7) (wire area roughly 1000 cir. mils per jump).
2. The secondary has a total of 231 turns. The bottom ⅓ has 77 turns of #8 wire. (Good for about 15-18 amperes). The top ⅔ has 154 turns of #13 wire (good for about 5-6 amps).
3. The iron stack has an area of 8.75 square inches. The laminations are butt stacked rather than interleaved and a 30 mil. piece of nomex paper is inserted in the stack to give the equivalent of a 30 mil. air gap. The result of this arrangement is as follows:
  a. The secondary of the transformer has an inductance which resonates with a capacitor (35 uf) at 60 Hz.
  b. The capacitor reflects 1800-2000 capacitive VAR's into the primary thus assuring commutation of the SCR's even under load conditions that are fairly inductive. The capacitor is across 360 volts and thus reflects 9 times the capacitive VARS into the primary than it would if put directly across the secondary. Thus, the capacitor can be 1/9 the size it would otherwise have to be to assure commutation.
  c. The effect of the secondary resonance is to smooth out the output (120 volt) waveform to approximately a sine wave thus allowing a wide variety of appliances (including inductive ones) to be plugged into the secondary 120 volts. In particular, appliances that could not tolerate a square wave output can readily be used.

Thus, the overall result is that the system can simultaneously provide 12-14 volts DC for vehicle needs and 120 volts 60 Hz. AC for appliance needs.

Regulation of both voltages individually or simultaneously is an important feature of the system. The basic objective is to regulate the output voltage when the alternator operator is in either of two modes, that is, first when it is simply providing 12-14 volts DC to the vehicle and the AC is OFF, and second, when it is providing both 12-14 volts DC to the vehicle and 120 VAC 60 cycle near sine wave to a load.

A better understanding of the invention will be had by reference to the following description and claims, taken in conjunction with the attached drawings.

DESCRIPTION OF THE DRAWINGS

The drawing, in the form of two sheets, is a wiring diagram of the system of this invention for providing a regulated low voltage DC source and a regulated high voltage AC source at a preselected frequency, such as 60 Hz., from the same windings of an alternator rotated at variable speeds. The circuit diagram is broken into FIGS. 1A and FIGS. 1B with the wiring interconnection indicated by the numerals 1 to 22.

DESCRIPTION OF THE PREFERRED EMBODIMENT

Figure 1A:
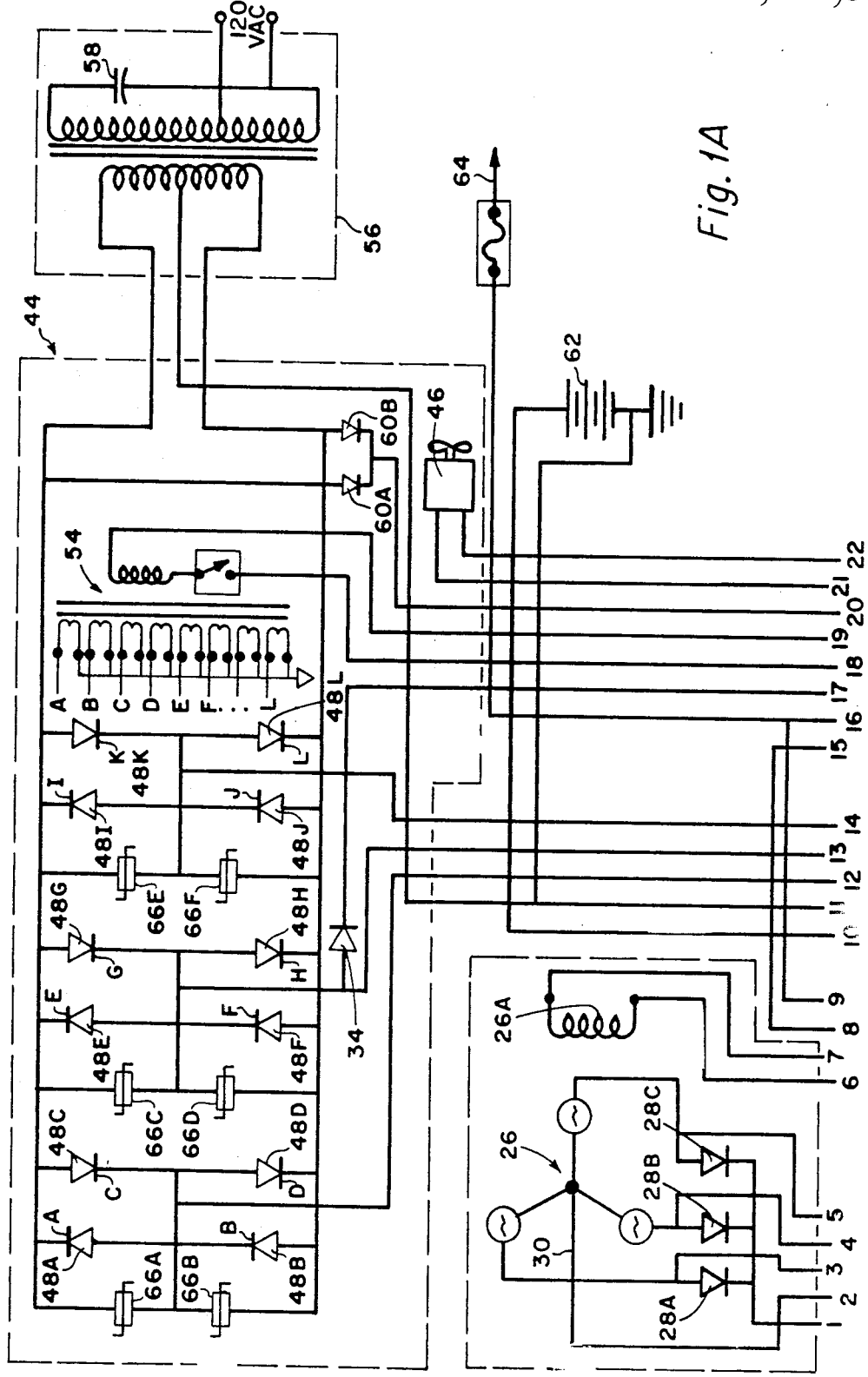
FIG. 1A includes the portions of the circuit primarily showing the alternator, the cycloconverter and the resonant transformer.

When the system is in the mode providing 12-14 volts only for vehicular use and battery charging, the three pole, double throw switch in the regulator is thrown to AC OFF/weld. The three pole, double throw switch is in the form of ganged switches 24A, 24B and 24C in FIG. 1B.

The alternator 26 which consists of three 14 volt phase windings connected in Wye configuration, provides a three phase, half wave rectified DC voltage at the terminal of the alternator. Three phase half wave rectification for this voltage is provided by diodes 28A, 28B and 28C in the alternator. The negative terminal 30 on the alternator is really the minus terminal. A six pole, double throw switch 32 mounted in the welder module is in the normal position as shown in the drawing. Under these conditions, the welder is out of the circuit.

Figure 1B:
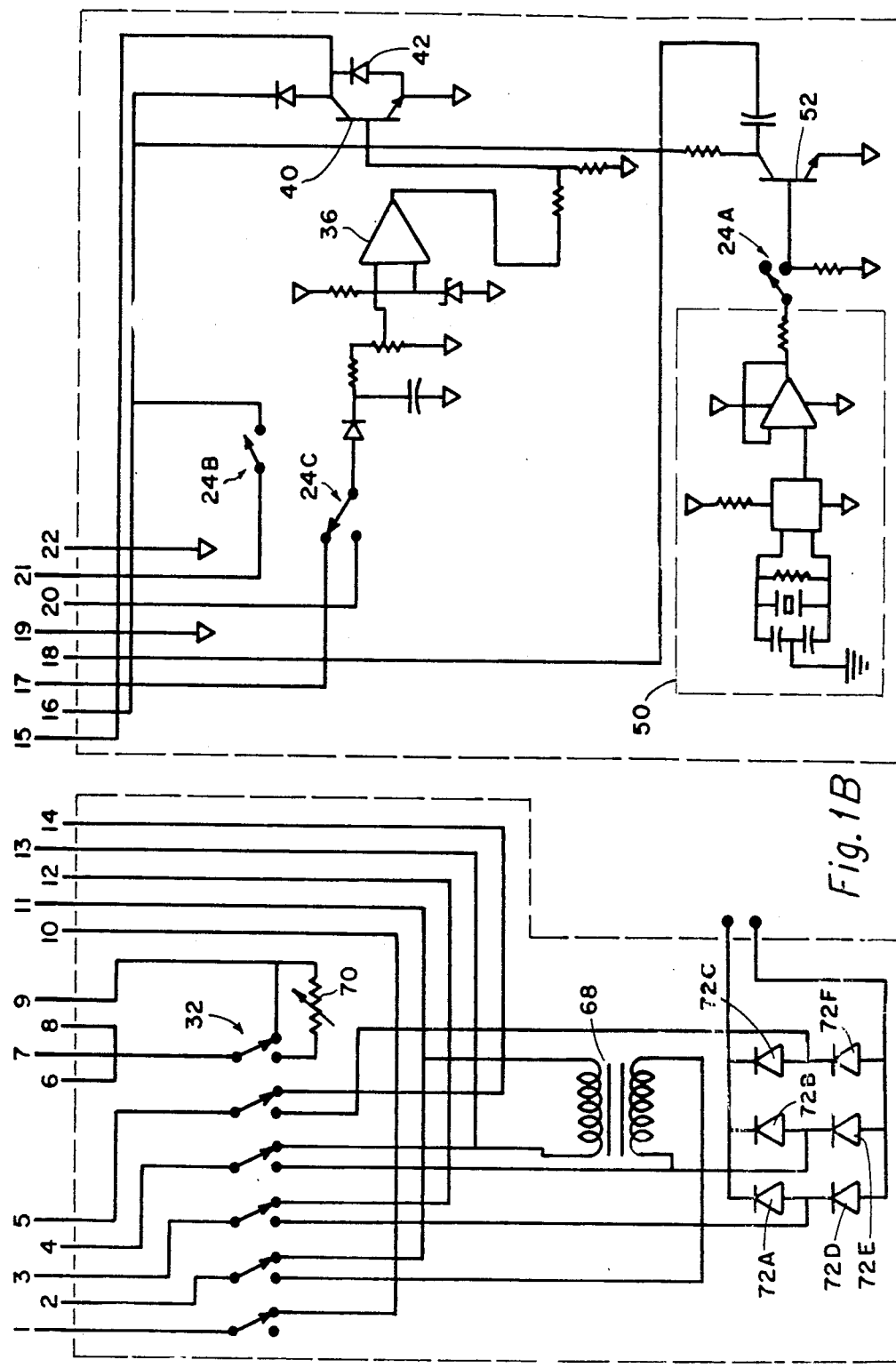
FIG. 1B shows the portions of the circuit including the welder output and the regulator.

Voltage regulation is provided by the regulator circuit shown in the right hand portion of FIG. 1B. A single phase of the alternator is sampled in the cycloconverter through a diode 34 and travels directly to the electronic regulator on wire 17.

The regulator takes the signal on wire 17, rectifies it, and feeds a portion of the resulting signal to an operational amplifier which compares it with the voltage on a 6.2 volt zener diode 38. If the signal voltage is low, a pulse of current is fed to the alternator field via a Darlington transistor 40. When the voltage comes up, the Darlington is shut off by the operational amplifier. The transient changes in voltage are filtered out by the high inductance of the alternator field. This high inductance simply does not allow instantaneous changes in alternator field current, and when the regulator Darlington transistor is not feeding any current, the current already in the winding is sustained by the inductive energy in the field through the three ampere diodes across it in the regulator circuit. The changes in voltage output are thus extremely small and slow, although the changes in voltage across the inductor alternator are high and instantaneous.

When the three pole switch 24 in the regulator circuit is switched to AC ON (that is, to the position opposite that shown in FIG. 1B), three things are changed. Square waves are applied to the SCR gates, thus, effectively triggering them in an appropriate sequence to be described below. Also, the regulator input signal is switched from wire 17 to wire 20 which samples the AC output of the cycloconverter generally indicated by numeral 44 rather than an alternator phase. Finally, +12 volts is fed to the cycloconverter heat sink fan, because a considerable amount of heat will now be generated by the silicon control rectifiers 48A through 48L in the cycloconverter.

Square waves at 60 Hz. (crystal controlled frequency) are continuously being generated by an integrated circuit chip 50 with its on board crystal oscillator and sixteen 2:1 dividers. The crystal operates at 3.93216 MHz. and when that is divided by 2 to the 16th power, the result is 60 Hz. When switch 24A is set to AC ON, that signal is applied to the base of another Darlington transistor 52 which feeds the primary, by way of conductor 18 of a gate pulse driver transformer 54 in the cycloconverter 44. For one half cycle of a 60 Hz. square wave SCR's 48A, 48C, 48E, 48G, 48I and 48J are switched ON, and for the other half cycle SCR's 48B, 48D, 48F, 48H, 48J and 48L are switched ON. Thus, for the first half cycle the primary of a resonating transformer primary 56 is fed positive top to bottom and for the other half cycle, the primary is fed positive bottom to top. Once the SCR's are turned ON, they must be commutated to OFF. Commutation is provided by the high frequency alternator voltages which reverse many times in a single 60 Hz. period. Thus, permanent inductive lockups can never occur in a cycloconverter whereas they are a continuous problem in an inverter using SCR's running on a DC source.

We do not want a square wave output, however, and the rounding of the square wave to provide a near sine wave is provided by the system including resonating transformer 56. The transformer has several unique design features. First, it has an air gap in the iron flux path chosen such that the secondary inductance approximately resonates with the capacitor 57 across it. The transformer secondary winding has a total voltage of 360 volts AC, and is tapped at 120 volts for the output. The capacitor is operating at 360 volts however and provides 1800 volt amperes reactive which is what is required. The same effect could be achieved at 120 volts and not have the extra winding on the transformer, but nine times the capacitance would be required (or 3150 microfarads -- the volt-amps of a capacitor vary as the square of the applied voltage). It is much cheaper to put the extra winding on the transformer and choose an air gap such that the secondary is resonated, thus, providing a near sine wave output. This allows the system to run a variety of appliances that wouldn't accept a square wave output.

Regulation is provided as before, but the regulated voltage sample now is taken from two diodes 60A and 60B in the cycloconverter which are connected to both sides of the low voltage AC (e.g. the voltage across the primary of transformer 56). Thus, the AC is now regulated except for the resonating transformer reactive drop which is not particularly important. When the 60 Hz. AC is being used, one must still charge the vehicle battery 62 and provide 12-14 volts for the vehicle at 64. However, the three phase diodes 28A, 28B and 28C in the alternator are still connected to the battery 62 and still provide the charging voltage, and that charging voltage is still adjusted according to alternator load. If the AC is being lightly used but the 12-14 volt load is heavy, the alternator voltage still drops, which drops the AC, which activates the regulator to bring it up. If the AC load is heavy, of course, the alternator voltage drops and the regulator calls for more AC voltage, thus simultaneously taking care of the vehicle DC. Thus, it the vehicle can be underway, the electrical system provides all normally necessary functions for the vehicle, both AC and DC loads can be varying independently, but the regulator takes care of both simultaneously up to the full output capability of the alternator.

Since alternator 26 is connected in a 4 wire Wye configuration, the voltage fed to the cycloconverter 44 is full wave rectified rather than half-wave rectified. The voltage is twice the DC voltage or 28 volts peak to peak at the primary of resonating transformer 56. If full wave rectification voltage was used, the cycloconverter would be required to operate at that voltage, calling for silicon control rectifiers that could carry twice the current with twice the IR loss. Thus, by carrying out the isolated neutral of the alternator, the circuit provides full wave rectification (switched in polarity every half cycle of the 60 Hz. frequency) for the cycloconverter providing a 60 Hz. waveform that is not chopped up. It will be noted that the neutral of alternator 26 is carried through to the center tapped primary of resonating transformer. If the neutral was not carried through to the center tap, the voltage end to end of the resonating transformer primary would be 1,732 times the line to neutral alternator voltage instead of twice the voltage, thus, calling for more turns in the secondary and higher current in the primary as well as in the SCR's. It will be noted that every SCR has a 40 volt 10 joule metal oxide varistor (MOV) in parallel with it. (Elements 66A through 66F.) SCR's are particularly sensitive to inductive voltage spikes, and AC inductive devices, (running AC motors always generate such spikes, especially when the AC inductive devices are switched OFF and ON). These MOV's are used as spike suppressors. Each 40 volt MOV will essentially short circuit anything above 100 volts, and the SCR's are rated at 200 volts. Thus, the MOV's greatly increase the cycloconverter reliability.

To use the device for welding, the 6 pole, double throw switch 32 should be thrown to "weld", that is, the position opposite that illustrated in FIG. 1B. This disconnects alternator 26 entirely from cycloconverter 44 as well as the rest of the vehicle and connects it to the welder portion of the circuit only. This is necessary because rather higher voltages occur in welding applications before an arc is struck and the rest of the system is not designed to withstand such voltages. This means that the vehicle engine operates on battery 62 only for ignition and the battery is not charged during welding. For long welding periods, the user should switch back every half hour or so and charge battery 62 for five or ten minutes.

In welding application, a rather high striking voltage to establish an arc (above 60 volts) is required, but then the voltage must immediately drop to around 20 to 30 volts after the arc is drawn. Further, it must be possible to control the current in the arc depending on the size of the welding rod or wire being used and the bulk and thickness of the metal being welded. Still further, the National Electric Code requires that the open circuit striking voltage not rise above 80 volts. This presents a problem because when an arc is being drawn, the regulator needs to provide full alternator field current, but that field current when the arc fails will instantaneously provide as much as 130 to 150 volts. The problem is handled as follows. When the 6 pole switch 36 is thrown to weld, transformer 68 is switched into the regulator circuit which steps down the alternator voltage applied to the regulator by a ratio of 2.45 to 1. Thus, when the open circuit voltage of the welder is 70 volts DC, the regulator thinks it is seeing about 14 volts line to neutral (28 volts clear across) and it holds the open circuit striking voltage at about 70 volts. When the arc is struck, however, the regulator cannot possibly hold the voltage at 70 volts so it applies continuous full field current to the alternator field 26A. The voltage drops to the 20 to 30 volt range and the field current is controlled entirely by the battery voltage and a series potentiometer 70 which was also switched into the field circuit by the pole switch 32. The output welding current can thus be adjusted from around 60 amperes to about 140 amperes. This accomodates everything from the smallest welding rod to the biggest required for most usage (5/32) inch diameter). When the arc is quenched for any reason, the voltage rises immediately to the striking voltage of about 70 volts. Diodes 72A through 72F provide full wave rectification of the three phase output from alternator 26 to produce the required DC welding voltage.

The claims in the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularlity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. A system for providing a regulated low voltage DC source and a regulated higher voltage AC source at a preselected frequency, such as 60 Hz., from the same windings of an alternator rotated at various speeds comprising:
   a three phase WYE connected engine driven alternator providing three output posts and a neutral post and having a field circuit;
   a half wave rectifier means connected at each said output post of said alternator providing a low voltage DC source;
   a cycloconverter means having a three phase input and a single phase output, said three phase input being connected to said alternator output posts;
   a transformer having a primary and a secondary winding and having the primary connected to the output of said cycloconverter single phase output;
   a capacitor across said transformer secondary matched to the inductance of said transformer secondary to provide resonance at said preselected frequency;
   a clock circuit providing an AC control voltage at said preselected frequency, the clock being connected to said cycloconverter;
   means to control said cycloconverter in response to said clock circuit to provide said AC output voltage thereof at said preselected AC frequency; and
   voltage regulator means connected to said alternator field circuit and responsive to the voltage output of said cycloconverter circuit to control the output voltage of said transformer.

2. A system for providing a regulated low voltage DC source and a regulated higher voltage AC source, at a preselected frequency, such as 60 Hz., and a regulated D.C. welding voltage source according to claim 1 wherein said resonating transformer provides, at the output thereof, a near sine wave voltage capable of handling inductive loads,
   whereby an AC voltage is available at said secondary of said transformer at a substantially constant voltage and frequency irrespective of the speed of rotation of said alternator.

3. A system for providing a regulated low voltage DC source and a regulated AC source at a preselected frequency according to claim 1 wherein said alternator has high reactance whereby said cycloconverter is protected from damage in the event of a short circuit across said transformer secondary.

4. A system for providing a regulated low voltage DC source, a regulated higher voltage AC source at a preselected frequency, such as 60 Hz., and a regulated DC welding voltage source from the same windings of an alternator rotated at various speeds comprising:
   a three phase WYE connected engine driven alternator providing three output posts and a neutral post and having a field circuit;
   a half wave rectifier means connected at each said output post of said alternator providing a low voltage DC source;
   a multiple pole double throw switch having the center position of each of three poles connected to a said alternator output post and providing first and second output posts for each of said switch poles;
   a full wave three phase rectifier means connected to said multiple pole double throw switch providing, in one position of said switch, a high current, low voltage DC output usable such as for welding;
   a cycloconverter means having a three phase input and a single phase output, said three phase input being connected to said multiple pole switch second posts;
   a transformer having a primary and a secondary winding and having the primary connected to the output of said cycloconverter single phase output;
   a capacitor across said transformer secondary matched to the inductance of said transformer secondary to provide resonance at said preselected frequency;
   a clock circuit providing an AC control voltage at said preselected frequency, the clock being connected to said cycloconverter;

means to control said cycloconverter in response to said clock circuit to provide said AC output voltage thereof at said preselected AC frequency; and voltage regulator means connected to said alternator field circuit and responsive to the voltage output of said cycloconverter circuit to control the output voltage of said transformer.

5. A system for providing a regulated low voltage DC source and a regulated higher voltage AC source, at a preselected frequency, such as 60 Hz., and a regulated D.C. welding voltage source according to claim 4 wherein said resonating transformer provides, at the output thereof, a near sine wave voltage capable of handling inductive loads, whereby an AC voltage is available at said secondary of said transformer at a substantially constant voltage and frequency irrespective of the speed of rotation of said alternator.

6. A system for providing a regulated low voltage DC source and a regulated AC source at a preselected frequency according to claim 4 wherein said alternator has high reactance whereby said cycloconverter is protected from damage in the event of a short circuit across said transformer secondary

* * * * *